US008733818B2

(12) United States Patent
Hooton et al.

(10) Patent No.: US 8,733,818 B2
(45) Date of Patent: May 27, 2014

(54) TWO-STAGE HYBRID CHECK LINK ASSEMBLY

(75) Inventors: Joel S. Hooton, Chesterfield, MI (US); Kevin K. Parkila, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 154 days.

(21) Appl. No.: 13/523,311

(22) Filed: Jun. 14, 2012

(65) Prior Publication Data

US 2013/0333159 A1 Dec. 19, 2013

(51) Int. Cl.
*B60J 5/00* (2006.01)

(52) U.S. Cl.
USPC ...................... 296/146.4; 296/146.1; 16/86 C

(58) Field of Classification Search
USPC ........ 296/146.4, 146.1, 146.11, 146.9; 16/54, 16/86 C
See application file for complete search history.

(56) References Cited

U.S. PATENT DOCUMENTS

| | | | | |
|---|---|---|---|---|
| 7,500,711 | B1 * | 3/2009 | Ewing et al. | 296/146.4 |
| 7,703,816 | B2 * | 4/2010 | Kitayama et al. | 292/262 |
| 8,414,062 | B2 * | 4/2013 | Gobart et al. | 296/146.4 |
| 2003/0037411 | A1 * | 2/2003 | Seo | 16/86 C |

* cited by examiner

*Primary Examiner* — Joseph Pape
(74) *Attorney, Agent, or Firm* — Quinn Law Group, PLLC

(57) ABSTRACT

A check link assembly for a vehicle closure is configured to be operable in two phases: a detent check phase and an infinite check phase. The vehicle closure is pivotably connected to a vehicle body and has a closed position and an open position. The check link assembly includes a detent assembly having a detent configured to provide a detent check position between the closed position and the open position. The check link assembly also includes a hydraulic or pneumatic strut operatively connected to the detent assembly and configured to provide check positions at all positions between the detent check position and the open position. The detent assembly and the strut are configured to operate in series as the door is pivoted.

20 Claims, 5 Drawing Sheets

TWO-STAGE HYBRID CHECK LINK ASSEMBLY

TECHNICAL FIELD

The present teachings generally include a check link assembly, such as for a vehicle closure.

BACKGROUND

Automotive vehicles include a vehicle body defining an interior compartment, such as a passenger compartment or a cargo compartment. Closures are selectively movable between open and closed positions to permit or obstruct access to the interior compartment. A latch is typically employed to maintain the closure in its closed position. To open the closure, a vehicle user typically must pull on a handle to release the latch and manually move the closure to the open position. Some closures are connected to the vehicle body by a check link assembly. A check link assembly establishes an intermediate check or stop position between the closed position and the open position and is designed to require additional force to move the door beyond the intermediate stop position. The closure is only partially open at the intermediate stop positions.

Detent check link assemblies provide a position where a detent is located. Detent check link assemblies are sometimes designed to store closing energy, so that the check link assembly provides additional force to urge the door toward the closed position when the door is being closed. In contrast, hydraulic and pneumatic strut check assemblies provide resistance to door movement at all points along a length of travel of a piston rod relative to a strut housing, and are therefore sometimes referred to as infinite check assemblies. Hydraulic and pneumatic strut check assemblies do not store closing energy.

SUMMARY

A check link assembly for a vehicle closure is configured to be operable in two phases: a detent check phase and an infinite check phase. The vehicle closure is pivotably connected to a vehicle body and has a closed position and an open position. The check link assembly includes a detent assembly having a detent configured to provide a detent check position between the closed position and the open position that serves as an intermediate stop position. A check position is a stable position of a closure between the closed position and an open position at which the closure is not free swinging as additional force is required to pivot beyond the check position. The check link assembly also includes a hydraulic or pneumatic strut operatively connected to the detent assembly and configured to provide hold open positions at all positions between the detent check position and the open position. The provision of hold open positions at all positions of a closure is referred to as an infinite check. The detent assembly and the hydraulic or pneumatic strut are configured to operate in series as the door is pivoted.

The hydraulic or pneumatic strut can have a strut housing that has an internal cavity fillable with a fluid, such as hydraulic fluid or air, and a piston rod at least partially within the internal cavity. The piston rod has a distal end configured to be connectable to one of the vehicle body and the vehicle door. The piston rod is configured to be selectively movable relative to the strut housing to provide check positions at all points along a length of travel of the piston rod relative to the strut housing.

The detent assembly can have a check housing, a biasing member, a bumper, and a base. The base is on the strut housing and defines the detent. The bumper is biased by the biasing member against the base and provides a check position for the closure between the closed position of the closure and the open position of the closure when the bumper is at the detent.

The check link assembly can have a valve that is configured to be opened by the bumper when the bumper is at the detent to permit movement of the piston rod relative to the strut housing. The check link assembly can also have a latching mechanism that is configured to latch the check housing with the bumper at the detent when the piston rod moves away from the latching mechanism.

Accordingly, the detent assembly affects movement of the closure between the closed position and the check position in a detent check phase, and the hydraulic or pneumatic strut affects movement of the closure between the check position and the open position in an infinite check phase. The base may be configured with a contoured surface that increases a biasing force on the bumper to store closing energy. Thus, the check link assembly can provide the benefit of stored closing energy as well as infinite check positions.

The above features and advantages and other features and advantages of the present teachings are readily apparent from the following detailed description of the best modes for carrying out the present teachings when taken in connection with the accompanying drawings.

DETAILED DESCRIPTION

Figure 1:
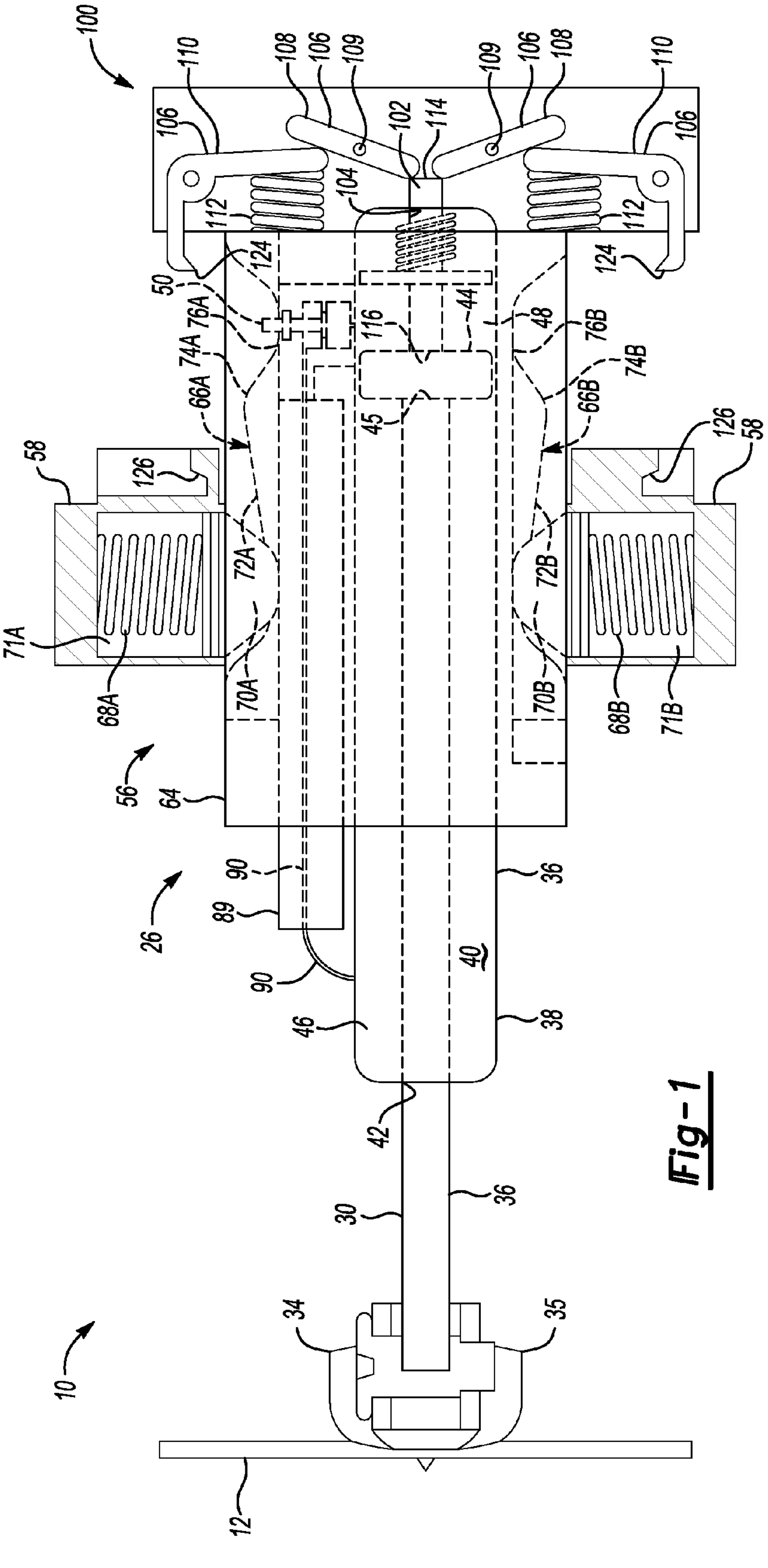
FIG. 1 is a schematic illustration in partially fragmentary and partial cross-sectional side view of a check link assembly attached to a portion of a vehicle body.
Figure 2:
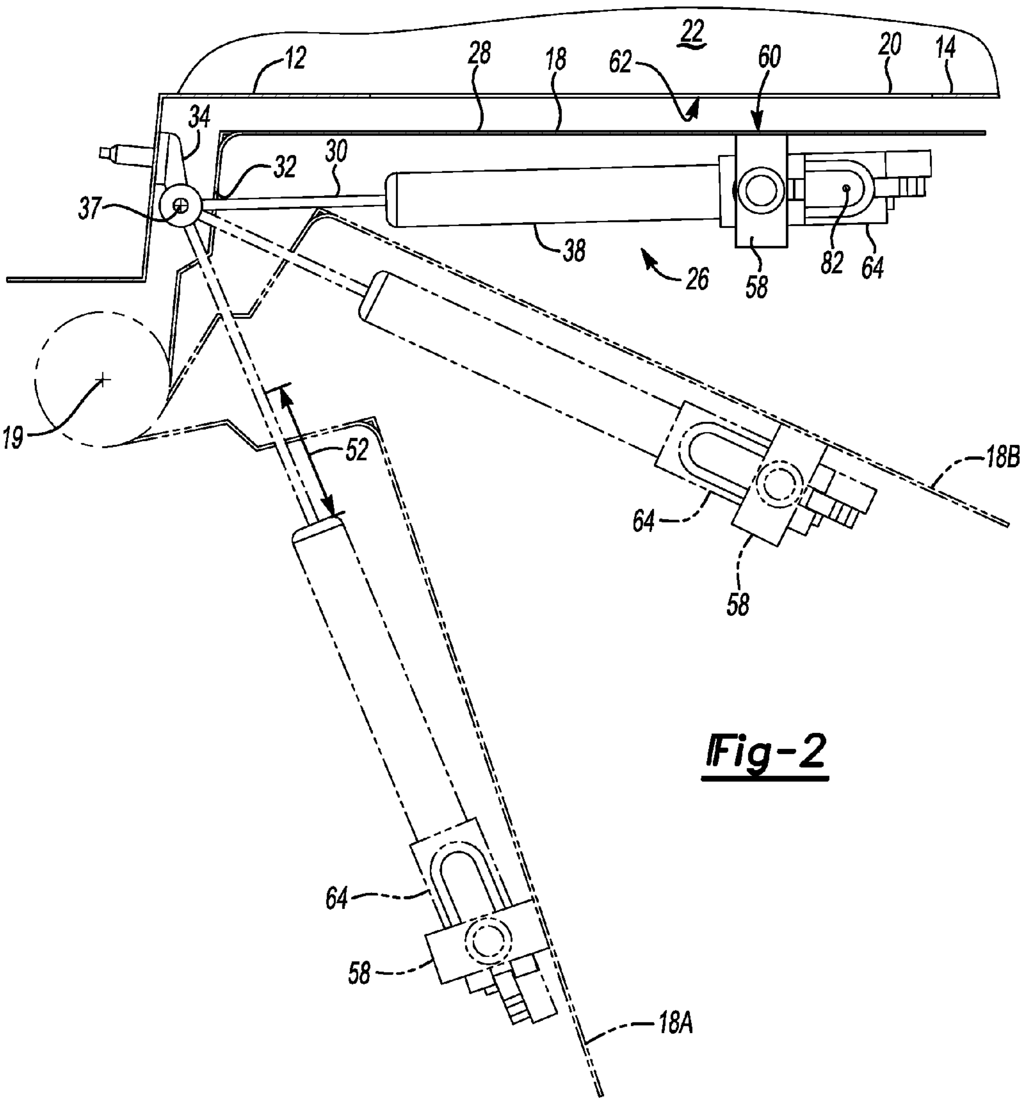
FIG. 2 is a schematic illustration in fragmentary and partially cross-sectional plan view of the check link assembly connected to the vehicle body and to a vehicle door inner panel in a closed position, and showing the check link assembly and door inner panel at both a check position and a fully open position in phantom.

Referring to the drawings, wherein like reference numbers are used to identify like or identical components in the various views, FIGS. 1 and 2 show a two-stage check link assembly 26 used in a portion of a vehicle 10 that includes a vehicle body, represented by a hinge pillar 12, such as an A-pillar, and a second pillar 14, such as a B-pillar, as understood by those skilled in the art. A vehicle closure, which in this embodiment is a door 18, is pivotably mounted to the hinge pillar 12 via at least one hinge (not shown) as understood by those skilled in the art. In other embodiments, the closure could be a deck lid or a hatch door.

Only an inner panel portion of the door 18 is shown. As shown in FIG. 2, the door 18 can be pivoted about an axis 19 between a closed position, and a fully open position 18A shown in phantom. In the closed position, the door 18 covers a door opening 20 at least partially defined by the pillars 12, 14, to prevent ingress and egress from a passenger compartment 22 through the opening 20. The door 18 will not open further than the fully open position 18A.

The check link assembly 26, also referred to as a "door check" or a "hold open," is mounted to the door and to the pillar 12 and is operable to provide two stages of operability as the door 18 moves from the closed position to the open position 18A. The first stage is a mechanical detent check stage, in which a single check position is provided to hold the door at the position 18B, referred to as a check position. Closing energy is stored during the first stage, as the check link assembly 26 is configured to urge the door 18 to the closed position when the door is between the check position 18B and the closed position and a force is applied to shut the door 18. As further explained herein, the second stage is referred to as an infinite check stage, as a hydraulic or pneumatic strut 36 of the check link assembly 26 is operable to provide a check position at any position between the check position 18B of the mechanical detent check stage, and the open position 18A. The two stages occur in series over the range of pivoting of the door 18 between the closed position and the open position 18A. Because the check link assembly 26 provides two distinct stages of operation, it is referred to as a hybrid check link assembly 26.

In FIG. 2, only an inner panel 28 of the door 18 is shown. An outer panel is not shown for purposes of clarity in the drawings, but would be connected to the inner panel, such as by hemming. Seals used to seal the inner panel 28 to the pillars 12, 14 when the door 18 is in the closed position, and a latch assembly that selectively latches the door 18 to the pillar 14 are also not shown for purposes of clarity in the drawing. The check link assembly 26 is connected to an inner surface of the inner panel 28 and is within a door cavity formed between the inner panel 28 and the outer panel, as will be readily understood by those skilled in the art. A piston rod 30 of a hydraulic or pneumatic strut 36 of the check link assembly 26 extends through an aperture 32 formed by the inner panel 28. A bracket 34 is mounted to the hinge pillar 12, and is pivotably mounted to a distal end 35 of the piston rod 30 so that the check link assembly 26 is selectively pivotable with respect to the hinge pillar 12 about a vertical axis 37 that is substantially parallel to the pivot axis 19 of the door 18.

Figure 6:
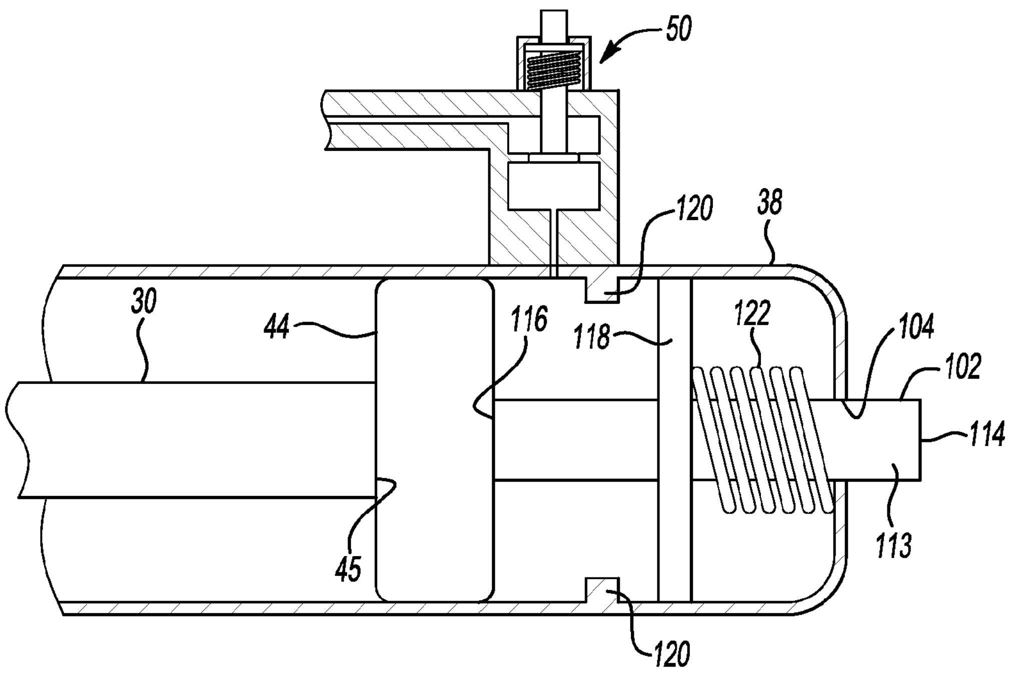
FIG. 6 is a schematic illustration in fragmentary partial cross-sectional view of a portion of the check link assembly of FIG. 1, showing a switch in a first position and the valve of FIGS. 4-5 in the closed position.
Figure 7:
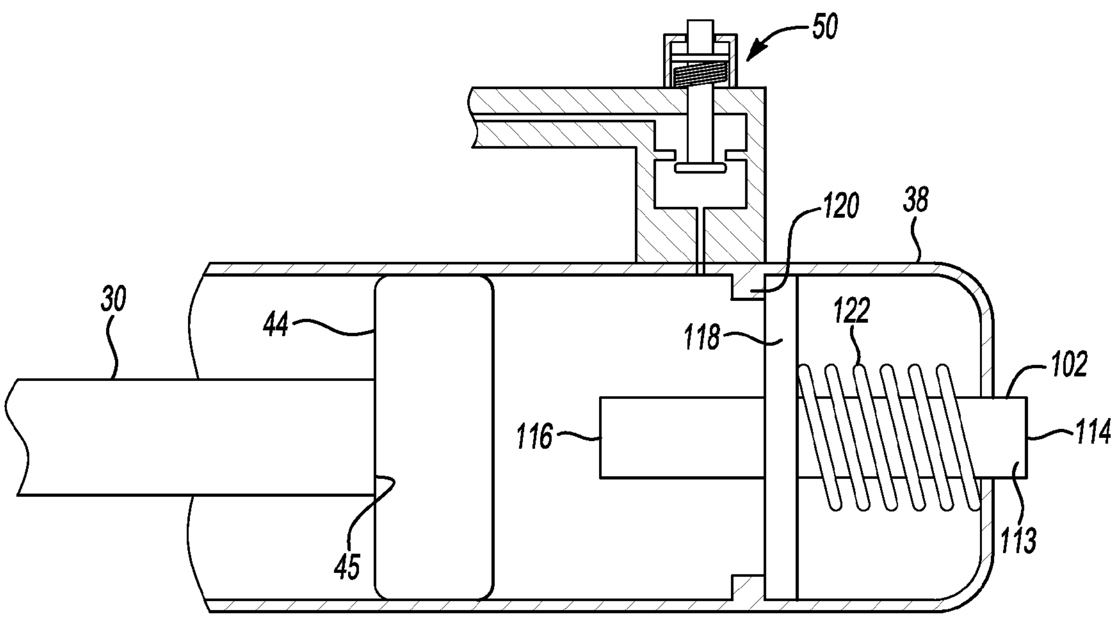
FIG. 7 is a schematic illustration in fragmentary partial cross-sectional view of a portion of the check link assembly of FIG. 1 showing the switch of FIG. 6 in a second position and the valve of FIGS. 3-6 in the open position.

The check link assembly 26 includes the hydraulic or pneumatic strut 36 that has a strut housing 38. The strut housing 38 defines an internal cavity 40 indicated in FIG. 2 and fillable with fluid, such as hydraulic fluid or air. The strut housing 38 may be configured as a cylinder, but is not limited to a cylindrical shape. The strut 36 also includes the piston rod 30, which extends into the internal cavity 40. A portion of the rod 30 extends outside of the cavity 40 through an aperture 42 in the strut housing 38 to connect to the bracket 34. A seal (not shown) may be placed at the opening 42 around the rod 30 to prevent leakage of the hydraulic fluid or air. A spool 44 is connected to an end 45 of the rod 30 opposite the distal end 35 along the length of the rod 30 and divides the internal cavity 40 into a first chamber 46 and a second chamber 48. The spool 44 is also shown in FIGS. 6 and 7.

Because the spool 44 divides the internal cavity 40 into two separate chambers, unless fluid can be transferred between the first chamber 46 and the second chamber 48, the rod 30 will not move relative to the strut housing 38. As further explained herein, a valve 50 is selectively moved to an open position that permits fluid to transfer between the chambers 46, 48, permitting the rod 30 and spool 44 to move axially within the chamber 40. The valve 50 is moved to the open position when the door 18 is at the check position 18B of FIG. 1. The movement of the rod 30 relative to the strut housing 38 is indicated by the length of travel 52 of the rod 30 between the check position 18B and the open position 18A in FIG. 2. The check position 18B is established by a detent assembly 56, as explained herein. Any position of the door 18 between the check position 18B and the open position 18 is a check position due to the resistance to flow of the hydraulic fluid or air. That is, when a force pivoting the door 18 is removed, the door 18 will remain at any given position between the check position 18B and the open position 18A. The second stage of operation of the check link assembly 26 can thus be referred to as an infinite check phase.

Figure 8:
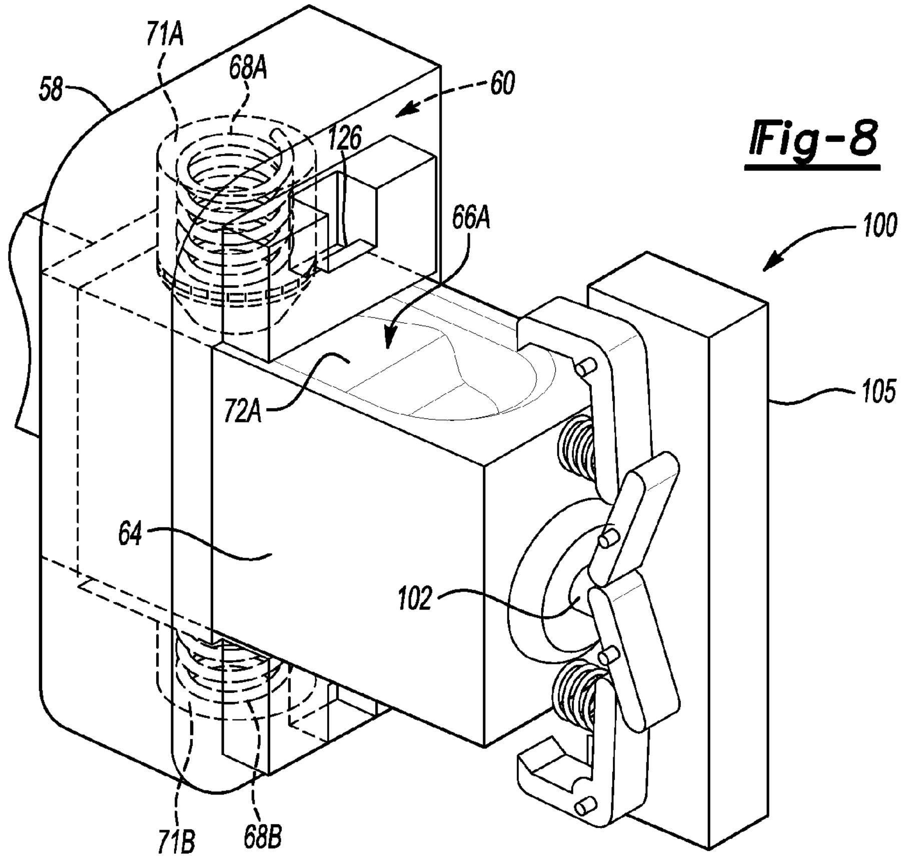
FIG. 8 is a schematic illustration in fragmentary perspective view of the check link assembly showing a latch assembly including latching arms in an unlatched position.

During the first phase of operation of the check link assembly 26, when the rod 30 cannot move relative to the housing 38, a detent assembly 56 of the check assembly 26 affects movement of the door 18. The detent assembly 56 includes a check housing 58 which is the portion of the check assembly 26 that is rigidly fixed to the door 18, as shown in FIG. 2. The check housing 58 is disposed within the door cavity 42 and mounted to the inner panel 28. Accordingly, pivoting of the door 18 with respect to the hinge pillar 12 causes relative movement between the housing 58, which is mounted to the door 18, and the rod 30, which is pivotably mounted to the hinge pillar 12. FIG. 8 shows a surface 60 of the check housing 58 that is in contact with the inner surface 62 of the inner panel 28 of the door 18, as shown in FIG. 2. The detent assembly 56 further includes a base 64 rigidly secured to the strut housing 38 such that it is not movable relative to the strut housing 38. The base 64 may be made integral with the strut housing 38. The base 64 defines a contoured surface 66A on an upper portion of the base 64 and another contoured surface 66B on a lower portion of the base 64 that is a mirror image of the contoured surface 66A on a lower portion. The contoured surface 66A is also shown in FIG. 8. Biasing members 68A, 68B, which in this embodiment are springs, bias bumpers 70A, 70B against the contoured surfaces 66A, 66B, respectively. The bumpers 70A, 70B can also be referred to as check pistons. As an alternative to the compression springs shown, the biasing members 68A, 68B could instead be torsion springs or another resilient compressible member. The check housing 58 has pockets 71A, 71B in which the biasing members 68A, 68B and bumpers 70A, 70B are captured between the housing 58 and the contoured surfaces 66A, 66B.

When the door 18 is pivoted between the closed position and the check position 18B of FIG. 2, the base 64 and the entire strut housing 38 and rod 30 pivot together as a unit about the pivot axis 37 while the check housing 58 pivots with the door 18 about the pivot axis 19. This causes the bumpers 70A, 70B to travel along the contoured surfaces 66A, 66B so that there is relative movement between the check housing 58 and the base 64. The biasing force of the biasing members 68A, 68B holding the bumpers 70A, 70B against the contoured surfaces 66A, 66B varies as the contoured surfaces 66A, 66B travel between the bumpers 70A, 70B. For example, in FIG. 1, the bumpers 70A, 70B are shown at a first position consistent with the closed position of the door 18. When the door 18 is pivoted toward the check position 18B of FIG. 2, the bumpers 70A, 70B, must ride up ramp portions 72A, 72B of the contoured surfaces 66A, 66B. The ramp portions 72A, 72B extend outward toward the check housing 58 until reaching apexes 74A, 74B, and then extend away from the check housing 58 until reaching a detent 76A, 76B. The valve 50 is positioned at the detent 76A. The biasing force against the bumpers 70A, 70B increases as the door is pivoted from the open position to the check position 18B, as the bumpers must ride up the ramped portion 72A, 72B to the apexes 74A, and 74B. The biasing force against the bumpers 70A, 70B thus decreases as the door pivots from the check position 18B to the closed position 18, because the bumpers 70A, 70B ride down the ramped portions 72A, 72B from the apexes 74A, 74B, decreasing compression of the biasing members 68A, 68B. Energy is thus stored in the compression of the biasing members 68A, 68B when the bumpers 70A, 70B move from the first position toward the check position 18B. The energy is released as the bumpers 70A, 70B move back toward the position of FIG. 1, which is the position of the bumpers 70A, 70B when the door 18 is in the closed position. The stored energy may be referred to as closing energy, as it urges the door 18 to the closed position.

Figure 4:
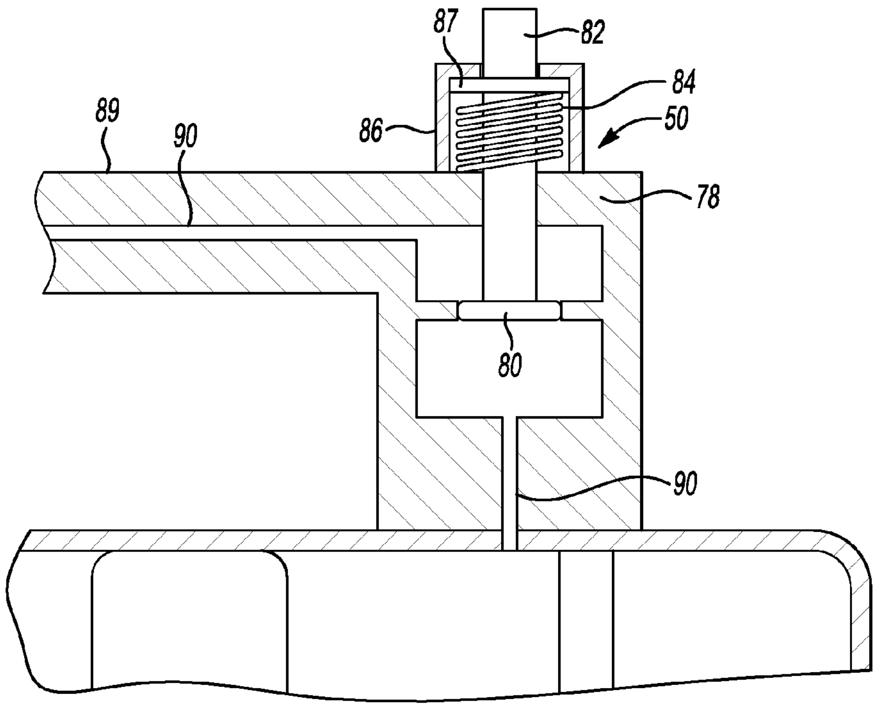
FIG. 4 is a schematic illustration in fragmentary cross-sectional view of the strut housing with the valve of FIG. 3 in a closed position.
Figure 5:
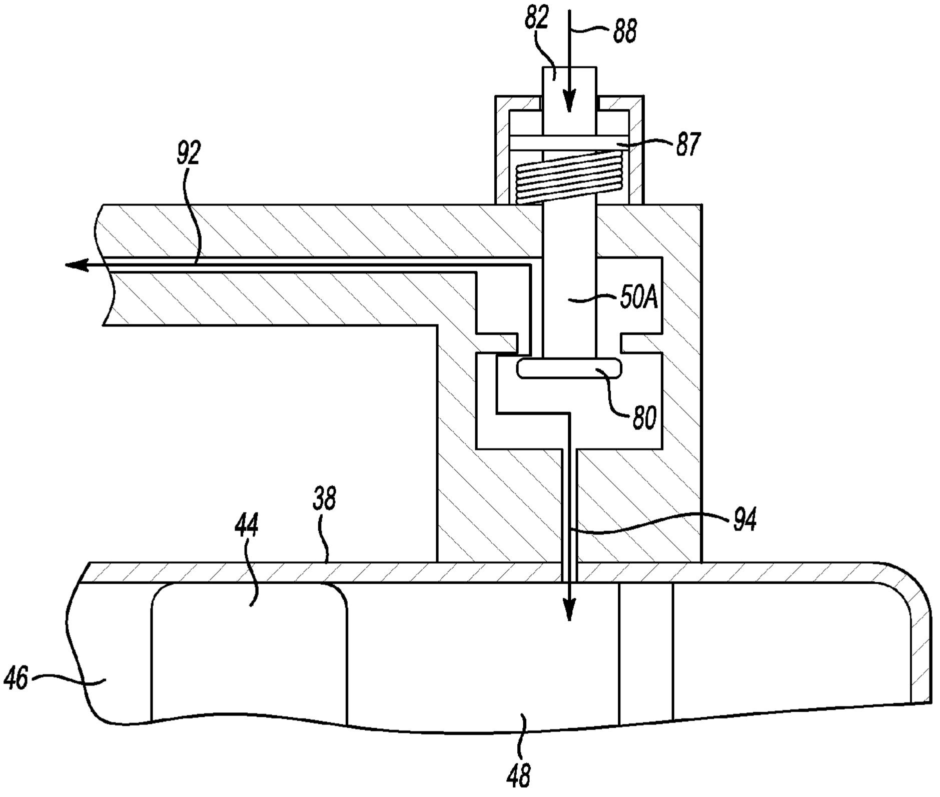
FIG. 5 is a schematic illustration in fragmentary cross-sectional view of the strut housing with the valve of FIGS. 3 and 4 in an open position.

When the bumpers 70A, 70B are at the detent 76A, 76B, the bumper 70A interferes with the valve 50 to open the valve 50, transitioning the check assembly 26 from the detent check phase to the infinite check phase. Specifically, as best shown in FIG. 4, the valve 50 includes a valve body 78 and a poppet 80 attached to a valve stem 82 that extends partially out of the valve body 78 at the detent 76A. A spring 84 is trapped in an upper portion 86 of the valve body 78 and presses against a land 87 that extends from the stem 82 to bias the valve 50 to a closed position shown in FIG. 4. When the bumper 70A is at the detent position 76A it sits on the stem 82, the biasing member 68A will cause the bumper 70A to apply a force 88 shown in FIG. 5 to compress the stem 82, moving the poppet 80 so that the valve 50 moves to the open position 50A shown in FIG. 5. When the valve 50 is in the open position 50A, hydraulic fluid or air can flow past the poppet 80 and circulate between the chambers 46, 48, allowing the rod 30 to move relative to the strut housing 38, establishing the infinite check phase of operation of the check link assembly 26.

Figure 3:
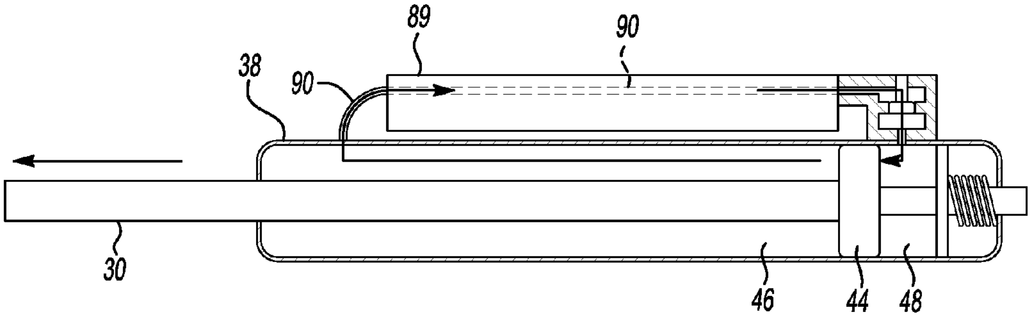
FIG. 3 is a schematic illustration in partial cross-sectional view of a portion of the check link assembly of FIG. 1, showing a valve that opens a conduit to enable fluid flow between separate chambers of a strut housing.

The base 64 includes a conduit housing 89 that at least partially defines a conduit 90 that fluidly connects the first chamber 46 to the second chamber 48 as shown in FIGS. 3 and 4. The conduit housing 89 may be integral with the valve housing 78, as shown in FIG. 4, and may furthermore be made unitary with the base 64. The valve 50 blocks flow through the conduit 90 when the valve 50 is in the closed position, and permits flow through the conduit 90 when the valve 50 is in the open position 50A. When the valve 50 is in the open position 50A of FIG. 5, fluid can flow in either direction through the valve body 78. Fluid flows in the direction of arrow 92, from the second chamber 48 to the first chamber 46, when the piston rod 30 and spool 44 are moving further into the strut housing 38, as the door 18 pivots toward the check position 18B from the open position 18A. Fluid flows in the direction of arrow 94, from the first chamber 46 to the second chamber 48, as the door 18 moves from the check position 18B toward the open position 18A.

The check link assembly 26 also includes a latch assembly 100 that works in tandem with the valve 50 to transition between the detent check phase and the infinite check phase of operation. Specifically, when the rod 30 is free to move relative to the strut housing 38 in the infinite check phase, the latch assembly 100 holds the check housing 58 so that the bumpers 70A, 70B remain at the detent 76A, 76B as the door 18 moves. The bumper 70A thus keeping the valve 50 open during the infinite check phase by keeping the force 88 of FIG. 5 on the valve stem 82.

Figure 9:
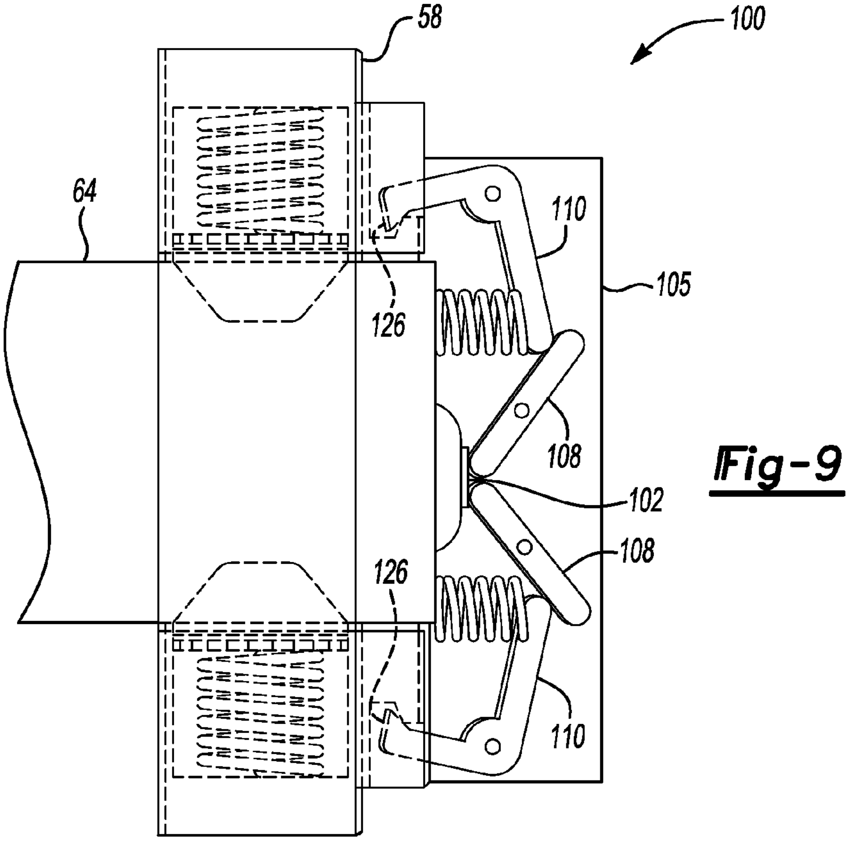
FIG. 9 is a schematic illustration in fragmentary side view showing the latching arms in a latched position.

The latch assembly 100 includes a switch 102 that extends partially out of an opening 104 in the strut housing 38. A seal (not shown) may be placed at the opening 104 around the switch 102 to prevent leakage of the hydraulic fluid or air. The latch assembly 100 has a latch housing 105 with latching arms 106 that are pivotably mounted on the latch housing 105. The latching arms 106 include a first pair of pivotable links 108 and a second pair of pivotable links 110. During the detent check phase of operation of the check valve assembly 26, the switch 102 is in a first position shown in FIGS. 1 and 6 consistent with the valve 50 being in a closed position. In the first position, the switch 102 pushes against ends of the links 108 inward of the pivot points 109 of the link 108. Portions of the links 108 outward of the pivot points 109 in turn maintain a force against the second pair of links 110 and against first springs 112. The first springs 112 urge the links 110 to a latching position to latch the check housing 58 as shown in FIG. 9, but the bias of the first springs 112 is overcome by the force of the switch 102 in the first position.

The switch 102 has a central rod 113. One end 114 of the central rod 113 extends out of the opening 104 in the strut housing into contact with the links 108 when the switch 102 is in the first position of FIG. 1. The other end 116 of the central rod 113 remains within the strut housing 38. A flange 118 extends outward from the central rod 113 within the strut housing 38. The strut housing 38 has a ledge 120 extending inward into the strut housing. A second spring 122 within the strut housing 38 is configured to bias the flange 118 toward the ledge 120. The central rod 113 is substantially aligned with the rod 30. When the valve 50 is closed during the detent check phase of the detent assembly 26, the spool 44 pushes the central rod 113 to the first position, and the second spring 122 is compressed between the flange 118 and the strut housing 38. When the valve 50 is opened by the bumper 70A, the rod 30 and the spool 44 can move away from the switch 102 to the second position of FIG. 7. The second spring 122 can then push the flange 118 against the ledge 120, moving the switch 102 to the second position shown in FIG. 7. In the second position, the end 114 of the central rod 113 is drawn closer to the strut housing 38, and allows the springs 112 to urge the links 108 to pivot toward the central rod 113 with the ends of the links 108 remaining in contact with the central rod 113. This pivoting of the links 108 allows the springs 122 to urge the links 110 to pivot so that latching ends 124 of the links 110 will latch to notched shoulders 126 of the check housing 158, as shown in FIG. 9. Accordingly, the check housing 58 is free from the latching arms 106 when the switch 102 is in the first position of FIGS. 1, 6 and 8, and the check housing 58 is held by the latching arms 106 when the switch 102 is in the second position of FIGS. 7 and 9, thereby preventing relative movement of the bumper 70A and the base 64. As discussed above, the position of the valve 50 ultimately controls the position of the switch 102. The valve 50 and the switch 102 thus operate to control functioning of the check assembly 26 in the first detent check phase and in the second infinite check phase.

It should be appreciated that when the door 18 moves from the closed position to the open position 18A, the phases occur in the order of the detent check phase first and then the infinite check phase second. When the door 18 moves from the open position 18A to the closed position, the phases occur in order of hydraulic phase first, then detent check phase second. The closing energy of the detent check phase due to the ramped portions 72A, 72B of the contoured surfaces 66A, 66B assist with closing.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A check link assembly for a vehicle closure pivotably connected to a vehicle body and having a closed position and an open position, the check link assembly comprising:

a detent assembly having a detent configured to provide a detent check position between the closed position and the open position;

a strut operatively connected to the detent assembly and configured to provide check positions at all positions between the detent check position and the open position; wherein the strut is one of a hydraulic and a pneumatic strut; and wherein the detent assembly and the strut are configured to operate in series as the door is pivoted.

2. The check link assembly of claim 1, wherein the strut has a strut housing with an internal cavity fillable with fluid and a piston rod at least partially within the internal cavity; wherein the piston rod has a distal end configured to be connectable to one of the vehicle body and the vehicle door; wherein the piston rod is configured to be selectively movable relative to the strut housing to provide check positions at all points along a length of travel of the piston rod relative to the strut housing;

wherein the detent assembly has a check housing, a biasing member, a bumper, and a base on the strut housing that defines the detent; wherein the bumper is biased by the biasing member against the base and provides a check position for the closure between the closed position and the open position when the bumper is at the detent;

a valve configured to be opened by the bumper when the bumper is at the detent to permit movement of the piston rod relative to the strut housing; and a latching mechanism configured to latch the check housing with the bumper at the detent when the piston rod moves away from the latching mechanism; the detent assembly thereby affecting movement of the closure between the closed position and the check position and the strut affecting movement of the closure between the check position and the open position.

3. The check link assembly of claim 2, wherein the base has a contoured surface that increases a biasing force on the bumper to store closing energy.

4. The check link assembly of claim 2, wherein the check housing has a shoulder and the latch assembly has a latch; wherein the latch is configured to hold the check housing at the shoulder.

5. The check link assembly of claim 2, wherein the latch assembly includes a switch and latching arms in contact with the switch; wherein the switch moves from a first position to a second position in response to movement of the rod relative to the strut housing when the valve is opened by the bumper; wherein the check housing is free from the latching arms when the switch is in the first position; and wherein the check housing is held by the latching arms when the switch is in the second position, thereby preventing relative movement of the bumper and the base.

6. The check link assembly of claim 5, wherein the latch assembly includes a latch housing; wherein the latching arms are pivotally connected to the latch housing; and further comprising:

first springs urging the latching arms to pivot toward the check housing.

7. The check link assembly of claim 5, further comprising a spool connected to an end of the piston rod opposite the distal end and substantially dividing the cavity into a first chamber and a second chamber;

wherein the strut housing has a ledge extending inward into the internal cavity around the central rod;

wherein the switch includes:

a central rod having one end extending out of an opening in the strut housing into contact with the latch assembly and another end within the strut housing;

a flange extending outward from the central rod within the strut housing;

a second spring within the strut housing configured to bias the flange against the ledge when the switch is in the second position; and wherein the spool pushes the central rod to compress the second spring when the switch is in the first position.

8. The check link assembly of claim 2, further comprising a spool connected to an end of the piston rod opposite the distal end and substantially dividing the cavity into a first chamber and a second chamber;

wherein the base at least partially defines a conduit that connects the first chamber to the second chamber; and wherein the valve blocks flow through the conduit when the valve is closed and permits flow through the conduit when the valve is open.

9. The check link assembly of claim 8, wherein the valve has a valve body and a poppet with a stem that extends partially out of the valve body at the detent; and wherein the stem is compressed by the bumper when the bumper is at the detent position to open the valve.

10. The check link assembly of claim 9, wherein the valve has a land extending from the stem and a spring between the land and the valve body that biases the valve to the closed position.

11. A vehicle comprising:

a vehicle body defining an opening;

a closure connected to the vehicle body and pivotable between a closed position in which the opening is closed by the closure, and an open position in which the opening is at least partially uncovered by the closure;

a detent assembly having a detent configured to provide a detent check position between the closed position and the open position;

a strut operatively connected to the detent assembly and configured to provide check positions at all positions between the detent check position and the open position; wherein the strut is one of a hydraulic and a pneumatic strut; and wherein the detent assembly and the strut are configured to operate in series as the door is pivoted.

12. The vehicle of claim 11, wherein the strut has a strut housing with an internal cavity fillable with fluid and a piston rod at least partially within the internal cavity; wherein the piston rod has a distal end connected to one of the closure and the vehicle body; wherein the piston rod is configured to be selectively movable relative to the strut housing to provide check positions at all points along a length of travel of the piston rod relative to the strut housing;

wherein the detent assembly has a check housing, a biasing member, a bumper, and a base on the strut housing that defines the detent; wherein the bumper is biased by the biasing member against the base and provides a check position for the closure between the closed position and the open position when the bumper is at the detent;

a valve configured to be selectively opened by the bumper at the check position to permit movement of the piston rod relative to the strut housing; and a latching mechanism configured to latch the check housing with the bumper at the detent when the piston rod moves away from the latching mechanism; the detent assembly thereby affecting movement of the closure between the closed position and the check position and the strut affecting movement of the closure between the check position and the open position.

13. The vehicle of claim 12, wherein the base has a contoured surface that varies the biasing of the bumper to store closing energy.

14. The vehicle of claim 12, wherein the check housing has a shoulder and the latch assembly has a latch; wherein the latch is configured to hold the check housing at the shoulder.

15. The vehicle of claim 12, wherein the latch assembly includes a switch and latching arms in contact with the switch; wherein the switch moves from a first position to a second position in response to movement of the rod relative to the strut housing when the valve is opened by the bumper; wherein the check housing is free from the latching arms when the switch is in the first position and is held by the latching arms when the switch is in the second position, thereby preventing relative movement of the bumper and the base.

16. The vehicle of claim 15, wherein the latch assembly includes a latch housing; wherein the latching arms are pivotally connected to the latch housing; and further comprising:

first springs urging the latching arms to pivot toward the check housing.

17. The vehicle of claim 15, further comprising a spool connected to an end of the piston rod opposite the distal end and substantially dividing the cavity into a first chamber and a second chamber;

wherein the strut housing has a ledge extending inward into the internal cavity around the central rod;

wherein the switch includes:

a central rod having one end extending out of an opening in the strut housing into contact with the latch assembly and another end within the strut housing;

a flange extending outward from the central rod within the strut housing;

a second spring within the strut housing configured to bias the flange against the ledge when the switch is in the second position; and wherein the spool pushes the central rod to the first position to compress the second spring when the switch is in the first position.

18. The vehicle of claim 12, further comprising a spool connected to an end of the piston rod opposite the distal end and substantially dividing the cavity into a first chamber and a second chamber;

wherein the base at least partially defines a conduit that connects the first chamber to the second chamber; and wherein the valve blocks flow through the conduit when the valve is closed and permits flow through the conduit when the valve is open.

19. The vehicle of claim 18, wherein the valve has a valve body and a poppet with a stem that extends partially out of the valve body at the detent; and wherein the stem is compressed by the bumper when the bumper is at the detent position to open the valve.

20. The vehicle of claim 19, wherein the valve has a land extending from the stem and a spring between the land and the valve body that biases the valve to the closed position.

* * * * *